United States Patent [19]
Park et al.

[11] Patent Number: 5,561,090
[45] Date of Patent: Oct. 1, 1996

[54] DIELECTRIC CERAMIC COMPOSITION FOR HIGH FREQUENCIES AND METHOD FOR PREPARATION OF THE SAME

[75] Inventors: Yung Park; Yoon H. Kim, both of Seoul, Rep. of Korea

[73] Assignee: Korea Institute of Science and Technology, Seoul, Rep. of Korea

[21] Appl. No.: 501,523

[22] Filed: Jul. 12, 1995

[30] Foreign Application Priority Data

Jul. 19, 1994 [KR] Rep. of Korea .................. 17416/1994

[51] Int. Cl.⁶ .................................................. C04B 35/49
[52] U.S. Cl. ................................................ 501/134
[58] Field of Search ............................................. 501/134

[56] References Cited

U.S. PATENT DOCUMENTS

| | | | |
|---|---|---|---|
| 4,665,041 | 5/1987 | Higuchi et al. | 501/134 |
| 4,764,494 | 8/1988 | Sakabe et al. | 501/138 |
| 4,767,732 | 8/1988 | Furukawa et al. | 501/138 |
| 4,988,650 | 1/1991 | Takagi et al. | 501/139 |
| 5,130,281 | 7/1992 | Sano et al. | 501/139 |

FOREIGN PATENT DOCUMENTS 55-34526  9/1980  Japan ................. H01B 3/12

*Primary Examiner*—Deborah Jones
*Attorney, Agent, or Firm*—Lowe, Price, Leblanc & Becker

[57] ABSTRACT

An improved dielectric ceramic composition for high frequencies and a method for preparation of the same, capable of being advantageously used for a dielectric resonator, a material of a substrate for an integrated circuit and the like in high frequency regions, which consists of a main component of $ZrO_2$, $TiO_2$, and $SnO_2$ and a sintering aid component of $ZnO$, $NiO$, $Nb_2O_5$, and $Mn(NO_3)_2 4H_2$. The main component consists of 38 to 58 wt % of $ZrO_2$, 22 to 43 wt % of $TiO_2$, and 9 to 26 wt % of $SnO_2$. And the sintering aid component consists of, with respect to the total amount of the main component, less than 7 wt % of $ZnO$, less than 10 wt % of $NiO$, less than 7 wt % of $Nb_2O_5$, and less than 4 wt %, of $Mn(NO_3)_2 4H_2O$, calculated on the basis of the weight ratio of $MnO_2$.

2 Claims, No Drawings

DIELECTRIC CERAMIC COMPOSITION FOR HIGH FREQUENCIES AND METHOD FOR PREPARATION OF THE SAME

BACKGROUND OF THE INVENTION

1. Field of the Invention

The present invention relates to a dielectric ceramic composition for high frequencies and a method for preparation of the same, and in particular to an improved dielectric ceramic composition of a $ZrO_2$—$TiO_2$—$SnO_2$ system for high frequencies and a method for a preparation of the same capable of being advantageously used for a dielectric resonator and a material of a substrate for an integrated circuit.

2. Description of the Conventional Art

Conventionally, various kinds of dielectric ceramics are widely used for the materials of a dielectric resonator and a substrate of a high frequency integrated circuit. Recently, efforts on developing dielectric material having excellent electrical performance have been actively conducted to meet the increasing demand for products related thereto.

As one of those efforts, a Japanese Patent Publication Serial Number 55-34526 discloses a composition containing titanium oxide ($TiO_2$), zirconium oxide ($ZrO_2$), stannic oxide ($SnO_2$), and nickel oxide (NiO); however, the composition generates a large amount of heat when used under an atmosphere of a high power circuit operated at a low frequency of 800 MHz.

In an attempt to resolve the above problems, another composition was disclosed in U.S. Pat. No. 4,665,041, which is directed to a composition which comprises a main component of a $TiO_2$—$ZrO_2$—$SnO_2$, system and additives composed of ZnO, NiO and $Nb_2O_5$; however, this composition has disadvantages in that its dielectric constant is only about 40, even though its Q value is 9000 at 7 GHz.

SUMMARY OF THE INVENTION

Accordingly, it is an object of the present invention to provide a dielectric ceramic composition for high frequencies and a method for preparation of the same, which overcome the problems encountered in a conventional dielectric ceramic composition for high frequencies and a method for preparation of the same.

It is another object of the present invention to provide an improved dielectric ceramic composition for high frequencies capable of being advantageously used for a dielectric resonator, a material of a substrate for an integrated circuit or the like, having a $ZrO_2$—$TiO_2$—$SnO_2$ system as a main component.

To achieve the above-described objects, there is provided a dielectric ceramic composition for high frequencies, which consists of a main component of $TiO_2$—$ZrO_2$—$Sn_2O$ system and a sintering aid component composed of ZnO, NiO, $Nb_2O_5$ and $Mn(NO_3)_2 4H_2O$.

DETAILED DESCRIPTION OF THE INVENTION

A dielectric ceramic composition for high frequencies according to the present invention comprises a main component of a $ZrO_2$—$TiO_2$—$SnO_2$ system and a sintering aid component composed of ZnO, NiO, $Nb_2O_5$ and $Mn(NO_3)_2 4H_2O$. The main component consists of 38 to 58 wt % of $ZrO_2$, 22 to 43 wt % of $TiO_2$, and 9 to 26 wt % of $SnO_2$. And the sintering aid component consists of, with respect to the total amount of the main component, less than 7 wt % of ZnO, less than 10 wt % of NiO, less than 7 wt % of $Nb_2O_5$, and less than 4 wt % of $Mn(NO_3)_2 4H_2O$, calculated on the basis of the weight ratio of $MnO_2$.

The reason for the compositional limitation of each compound according to the present invention is explained as follows.

To begin with, if the content of the $ZrO_2$ is more than 58% or less than 38 wt %, the temperature coefficient of resonant frequency $\tau_f$ increases in a positive direction and the quality coefficient Q decreases. Thus, a preferable content range of $ZrO_2$ is 38 wt % to 58 wt %.

Next, in case of $TiO_2$, the preferable content range is 22 wt % through 43 wt %. The reason is that if the content of $TiO_2$ is below 22 wt %, the dielectric constant becomes lowered. If the content of $TiO_2$ exceeds 43%, the temperature coefficient of resonant frequency $\tau_f$ tends to have a relatively high positive value.

In addition, if the content of $SnO_2$ exceeds 26 wt %, the temperature coefficient of resonant frequency $\tau_f$ tends to have a negative value. Thus, the upper limitation of this additive is 26%.

Meanwhile, the reason for the limitation of the content of the sintering aid component is explained as follows.

When the content of $ZrO_2$ exceeds 7 wt % with respect to the main component, the quality coefficient Q and dielectric rate decrease. In addition, when the content of $NiO_2$ and $Nb_2O_5$ exceed 10%, respectively with respect to the main component, the quality coefficient Q becomes worsened. Moreover, when $Mn(NO_3)_2 4H_2O$ is added in an amount exceeding 4 wt % calculated on the basis of the weight ratio of $MnO_2$, the quality coefficient Q becomes low, and the sintered state is worsened.

The preparation process of the dielectric ceramic composition for a high frequencies according to the present invention is as follows.

The powders of the main component and sintering aid component is weighed within the aforementioned ranges and mixed together, calcined at a temperature range of 1000° to 1200° C. and then ground. Thereafter, a molding process followed and the molded compound is sintered at a temperature range of 1300°~1500° C. under an oxygen atmosphere.

The dielectric ceramic composition prepared thereby has a relatively high dielectric constant of more than 40 at 8~9 GHz and a stable temperature coefficient of resonant frequency of less than 20 ppm/°C.

EXAMPLE

The powders of the main composition having over 99% purity and sintering aid components were weighed according to the table I, and then mixed for about 2 hours using a nylon jar, a $ZrO_2$ ball, and a planetary mill.

At this time, distilled water is used as a dispersant. The resultant slurry was dried and heat-treated at a temperature of 1000°~1200° C. and then pulverized to a suitable size.

The pulverized powder mixture was molded under a pressure of 2500 kg/cm² using a dried-type pressure for fabricating specimens having a diameter of 10.0 mm, and a thickness of 4.0 mm.

Thereafter, the specimens were sintered at a temperature of 1300° to 1500° C. under an oxygen atmosphere for about four hours. Both sides of the specimens were ground to have flat surfaces. Thereafter, according to the Hakki Coleman method, quality factor and dielectric constant (k) of the specimens were measured at 8~9 Hz. The temperature coefficient of resonant frequency $\tau_f$ was determined at 25° to 100° C. Results are shown in Table I.

TABLE I

Compositions and Properties of Dielectric Ceramic Composition

| specimen | Main Component (wt. %) | | | Sintering Aid Component (wt. %) | | | | Sintering Temp. (°C.) | Dielectric rate | Q | $\tau_f$ (ppm/°C.) |
| --- | --- | --- | --- | --- | --- | --- | --- | --- | --- | --- | --- |
| | $ZrO_2$ | $SnO_2$ | $TiO_2$ | ZnO | NiO | $Nb_2O_5$ | $MnO_2$ | | | | |
| 1 | 39 | 21 | 40 | 0.4 | 0.3 | 0.9 | 0.7 | 1350 | 43 | 5600 | 5 |
| 2* | 36 | 24 | 40 | 0.4 | 0.5 | 0.5 | 0 | 1370 | 40.5 | 4000 | −80 |
| 3 | 39 | 21 | 40 | 1.0 | 0.5 | 2.0 | 0.4 | 1410 | 44 | 5500 | 3 |
| 4 | 44 | 16 | 40 | 0.9 | 0.4 | 0.7 | 0.5 | 1380 | 44 | 6200 | 8 |
| 5 | 48 | 14 | 38 | 1.0 | 0.5 | 1.0 | 0.5 | 1360 | 42 | 5600 | −2 |
| 6 | 39 | 22 | 40 | 0.5 | 0.2 | 1.0 | 0.6 | 1380 | 43.5 | 5800 | 4 |
| 7* | 36 | 24 | 40 | 1.0 | 0.5 | 0.5 | 0 | 1360 | 40.2 | 4000 | −82 |
| 8 | 39 | 21 | 40 | 1.0 | 0.5 | 3.0 | 0.4 | 1380 | 43.2 | 6100 | 4 |
| 9* | 58 | 20 | 22 | 8.0 | 5.0 | 6.0 | 0 | 1350 | 26.5 | 2800 | −41 |
| 10* | 56 | 24 | 20 | 1.0 | 0.2 | 0.5 | 0 | 1380 | 31.5 | 5300 | 80 |
| 11* | 48 | 9 | 43 | 0.5 | 0 | 0 | 0 | | not sintered | | — |
| 12 | 48 | 24 | 28 | 1.0 | 0.5 | 1.0 | 2 | 1360 | 42 | 6300 | 15 |
| 13 | 39 | 21 | 40 | 0.8 | 0.6 | 1.1 | 5 | 1350 | 32 | 3200 | 20 |

*: comparative specimen
Mn is added as $Mn(NO_3)_2 \cdot 4H_2O$.

What is claimed is:

1. A dielectric ceramic composition for high frequencies, comprising a main component of $TiO_2$—$ZrO_2$—$SnO_2$ system and a sintering aid component of ZnO, NiO, $Nb_2O_3$, and $Mn(NO_3)_2 4H_2O$, said main component consisting essentially of 22 to 43 wt % of $TiO_2$, 38 to 58 wt % of $ZrO_2$, and 9 to 26 wt % of $SnO_2$ and sintering aid component consisting essentially of, with respect to the amount of the main component, less than 7 wt % of ZnO, less than 10 wt % of NiO, less than 7 wt % of $Nb_2O_5$, and less than 4 wt % of $Mn(NO_3)_2 4H_2O$ calculated on the basis of the weight ratio of $MnO_2$.

2. A method for preparing the dielectric ceramic composition of claim 1 which comprises mixing the main component and sintering aid component calcining the obtained mixture at 1000°–1200° C. and then sintering at 1300°–1500° C. under an oxygen atmosphere.